(12) United States Patent
Koreeda et al.

(10) Patent No.: US 9,182,555 B2
(45) Date of Patent: Nov. 10, 2015

(54) BACKPLANE OPTICAL CONNECTOR

(71) Applicant: JAPAN AVIATION ELECTRONICS INDUSTRY, LIMITED, Tokyo (JP)

(72) Inventors: Yuichi Koreeda, Tokyo (JP); Kohji Nakagawa, Tokyo (JP); Rika Nomura, Tokyo (JP); Norio Chujo, Tokyo (JP)

(73) Assignee: JAPAN AVIATION ELECTRONICS INDUSTRY, LIMITED, Tokyo (JO)

( * ) Notice: Subject to any disclaimer, the term of this patent is extended or adjusted under 35 U.S.C. 154(b) by 0 days.

(21) Appl. No.: 14/405,972

(22) PCT Filed: Apr. 11, 2013

(86) PCT No.: PCT/JP2013/060884
§ 371 (c)(1),
(2) Date: Dec. 5, 2014

(87) PCT Pub. No.: WO2014/002572
PCT Pub. Date: Jan. 3, 2014

(65) Prior Publication Data
US 2015/0147031 A1    May 28, 2015

(30) Foreign Application Priority Data
Jun. 26, 2012   (JP) ................. 2012-143275

(51) Int. Cl.
G02B 6/43    (2006.01)
G02B 6/38    (2006.01)

(52) U.S. Cl.
CPC ............ *G02B 6/3882* (2013.01); *G02B 6/3825* (2013.01); *G02B 6/3897* (2013.01); *G02B 6/43* (2013.01)

(58) Field of Classification Search
None
See application file for complete search history.

(56) References Cited

U.S. PATENT DOCUMENTS

| 5,080,461 A * | 1/1992 | Pimpinella ................. 385/65 |
| 5,155,784 A | 10/1992 | Knott |
| 6,406,192 B1 | 6/2002 | Chen et al. |
| 6,606,427 B1 * | 8/2003 | Graves et al. ................ 385/17 |

(Continued)

FOREIGN PATENT DOCUMENTS

| JP | 5-60939 | 3/1993 |
| JP | 2001-228369 | 8/2001 |

(Continued)

OTHER PUBLICATIONS

English translation of written opinion for PCT/JP2013/060884, dated Jul. 23, 2013.*

*Primary Examiner* — Mike Stahl
(74) *Attorney, Agent, or Firm* — Greenblum & Bernstein, P.L.C.

(57) ABSTRACT

A backplane optical connector includes a first connector secured to a backplane and a second connector mounted on a daughter board. The first connector includes a first optical input-output part, guide holes, and a shutter. The shutter is a plate that covers the first optical input-output part when the daughter board is not inserted. The second connector includes guide pins, a pressing part, and a second optical input-output part. The guide pins first make contact with the first connector and are inserted into the guide holes. The pressing part pivots the shutter after degrees of freedom of the second connector are restricted by the guide pins and the guide holes. There is a space for accommodating the pivoted shutter between the pressing part and the second optical input-output part. The pressing part does not make contact with the first connector until the pressing part makes contact with the shutter.

4 Claims, 10 Drawing Sheets

(56) References Cited

U.S. PATENT DOCUMENTS

| | | |
|---|---|---|
| 2002/0176671 A1* | 11/2002 | Tourne .......................... 385/88 |
| 2003/0044125 A1* | 3/2003 | Kiani et al. .................... 385/78 |
| 2004/0052472 A1* | 3/2004 | Roth et al. ..................... 385/56 |
| 2012/0082418 A1 | 4/2012 | Takahashi et al. |

FOREIGN PATENT DOCUMENTS

| | | |
|---|---|---|
| JP | 2004-240162 | 8/2004 |
| WO | 2011-087077 | 7/2011 |

* cited by examiner

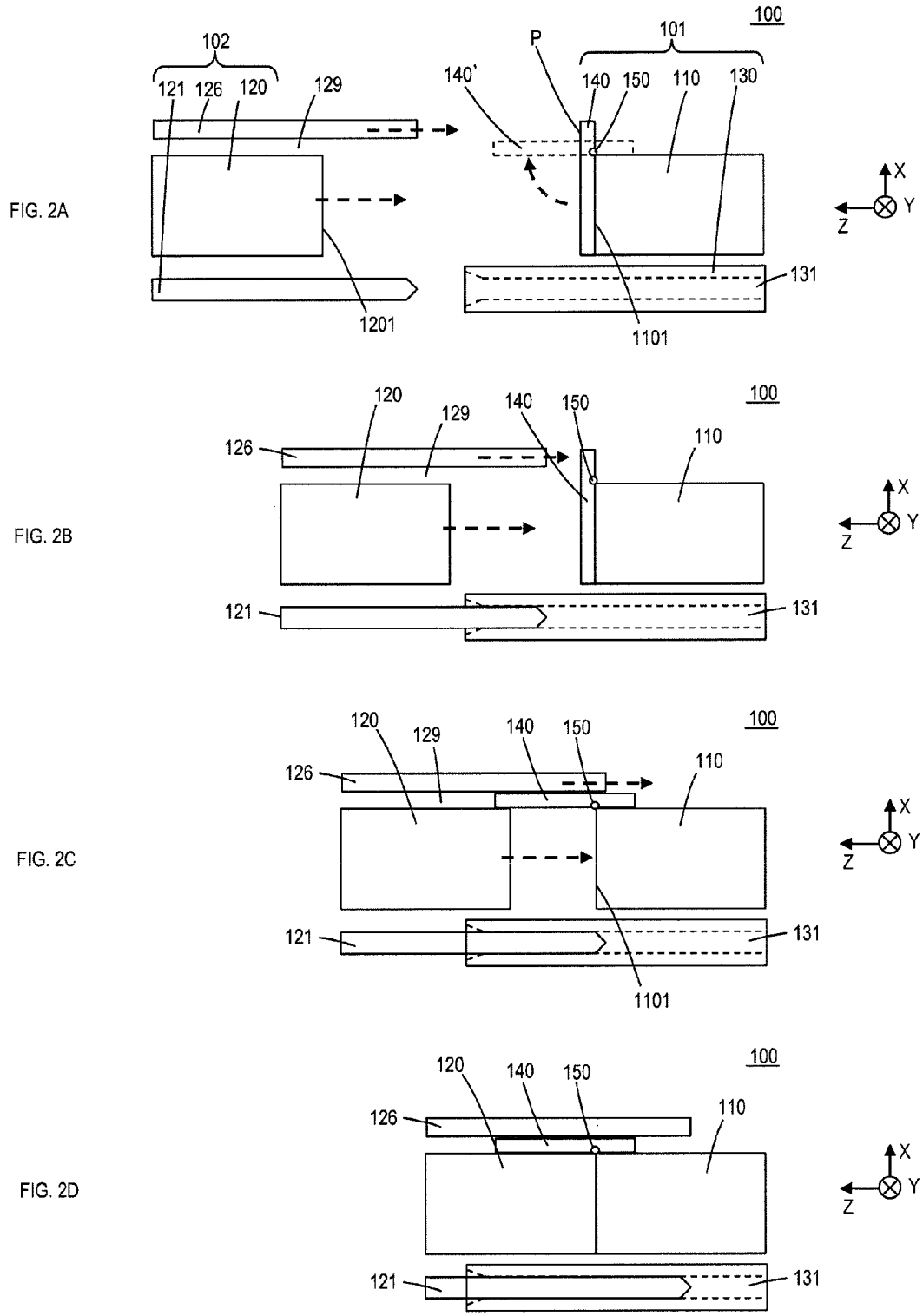

BACKPLANE OPTICAL CONNECTOR

TECHNICAL FIELD

The present invention relates to a backplane optical connector comprising a first connector secured to a backplane and a second connector mounted on a daughter board allowed to be inserted or removed in a direction orthogonal to a surface of the backplane.

BACKGROUND ART

There is a technique for attaching, to an apparatus (for example, a communicating apparatus), a backplane (mother board) to which a plurality of daughter boards can be connected in advance and inserting or removing a required number of daughter boards in a direction orthogonal to a surface of the backplane as necessary. In this technique, the worker inserts a daughter board by handling its edge away from the backplane. This connects the connector mounted on a portion of the daughter board close to a backplane to the connector mounted on the backplane.

In the backplane optical connector, since the worker cannot grasp the connectors mounted on the daughter board and the backplane, accurate positioning between the connectors is impossible. In addition, since the backplane is installed during investment of equipment and a daughter board is inserted as necessary, contamination may adhere to an exposed portion of the backplane before the daughter board is inserted. However, since the backplane is located at the back of the apparatus as seen from the worker, it is difficult to clean the backplane after installation.

The backplane optical connector proposed in patent literature 1 is known as a backplane optical connector used in such conditions. FIGS. 8A and 8B schematically show the structure of the backplane optical connector proposed in patent literature 1. First, it is assumed that the direction orthogonal to a surface of the daughter board is the X direction, the direction parallel to a surface of the daughter board and a surface of the backplane is the Y direction, and the direction orthogonal to a surface of the backplane is the Z direction. A backplane optical connector 900 proposed in patent literature 1 includes a first connector 910 mounted on a backplane, a second connector 920 mounted on a daughter board, a cover 930 and a shutter 940 that are mounted on the backplane to cover the first connector 910, and a rotary shaft 950 about which the shutter 940 is pivoted. FIG. 8A shows a state in which the second connector 920 is approaching the first connector 910 during insertion of the daughter board. FIG. 8B shows a state in which a first optical input-output part 9101 of the first connector 910 and a second optical input-output part 9201 of the second connector 920 make contact and are optically connected with each other. The backplane optical connector 900 includes the cover 930 and the shutter 940 to protect the first optical input-output part 9101 of the first connector 910 from contamination. If the daughter board is inserted, the second connector 920 presses and opens the shutter 940 and the second optical input-output part 9201 makes contact with the first optical input-output part 9101. Although not shown in FIGS. 8A and 8B, the first connector 910 is mounted on the mother board using a floating structure so as to have degrees of freedom in the X direction and the Y direction. That is, the first connector 910 can move to some extent in the X direction and the Y direction. When the daughter board is inserted, the positions in the X direction and the Y direction of the first connector 910 and the second connector 920 are adjusted by the guide.

The technique proposed in patent literature 2 is also known as an optical connector (although not for a backplane) with a shutter for protection from contamination. FIGS. 9A to 9C show the structure and the motion of the shutter of the optical connector proposed in patent literature 2. Although both the first connector and the second connector have shutters in the technique proposed in patent literature 2, only the shutter of the first connector is shown in FIGS. 9A to 9C to simply describe the parts related to the present invention. An optical connector 905 proposed in patent literature 2 includes a first connector 915 having a first optical input-output part 9151, a second connector 925 having a second optical input-output part 9251, a shutter open-close assisting means 935 on a first connector side, a shutter 945, a rotary shaft 955 about which the shutter 945 is pivoted, and a pressing pieces 926 on a second connector side.

FIG. 9A shows a state in which a second connector 925 is approaching the first connector 915. FIG. 9B shows a state in which the pressing pieces 926 are inserted inside the shutter open-close assisting means 935 to determine the positions of the first connector 915 and the second connector 925 and the shutter 945 is opened because the pressing pieces 926 presses part P of the shutter 945. FIG. 9C shows a state in which the first optical input-output part 9151 of the first connector 915 and the second optical input-output part 9251 of the second connector 925 make contact and are optically connected with each other. The shutter (not shown) of the second connector 925 is pressed by the pivoted shutter 945 and opened in the same manner.

PRIOR ART LITERATURE

Patent Literature

Patent literature 1: Japanese Patent Application Laid Open No. 2001-228369

Patent literature 2: Japanese Patent Application Laid Open No. 2004-240162

SUMMARY OF THE INVENTION

Problems to be Solved by the Invention

However, both the technique in patent literature 1 and the technique in patent literature 2 have a problem in that contamination is scattered in a travel path of the second optical input-output part. This problem will be described with reference to FIGS. 10A, 10B, 11A, and 11B. FIGS. 10A and 10B show problems with the backplane optical connector proposed in patent literature 1 and FIGS. 11A and 11B show problems with the optical connector proposed in patent literature 2. FIG. 10A shows contamination 999 adhering to the outer surface of the shutter 940. FIG. 10B shows scattering of the contamination 999 adhering to the shutter 940 during insertion of the second connector 920. In the technique in patent literature 1, since the shutter 940 is opened with its contaminated surface exposed to the first optical input-output part 9101 and the second optical input-output part 9201 and the second connector 920 approaches the first connector 910 while making contact with the contaminated surface, the contamination is scattered in the travel path of the second optical input-output part 9201. Accordingly, the first optical input-output part and the second optical input-output part may be contaminated in the backplane optical connector proposed in patent literature 1.

FIG. 11A shows contamination adhering to the outside of the shutter 945 and the inside of the shutter open-close assisting means 935. FIG. 11B shows scattering of the contamination 999 adhering to the inside of the shutter open-close assisting means 935. In the technique in patent literature 2, the shutter 945 is opened with the surface opposite to its contaminated surface exposed to the first optical input-output part 9151 and the second optical input-output part 9251. However, if the inside of the shutter open-close assisting means 935 is contaminated, the pressing pieces 926 approach the shutter 945 while making contact with the inside of the shutter open-close assisting means 935, so the contamination is scattered in the travel path of the second optical input-output part 9251. Accordingly, if the structure of the optical connector in patent literature 2 is applied to the backplane optical connector, the first optical input-output part and the second optical input-output part may be contaminated.

The present invention addresses such a situation, with the object of providing a backplane optical connector in which the first optical input-output part and the second optical input-output part are protected from contamination.

Means to Solve the Problems

A backplane optical connector according to the present invention comprises a first connector secured to a backplane and a second connector mounted on a portion of a daughter board close to the backplane, the daughter board being allowed to be inserted or removed in a direction orthogonal to a surface of the backplane. It is assumed that the direction orthogonal to a surface of the daughter board is the X direction, the direction parallel to a surface of the daughter board and a surface of the backplane is the Y direction, and the direction orthogonal to a surface of the backplane is the Z direction. It is also assumed that the second connector is mounted on the daughter board to have degrees of freedom in the X direction and the Y directions.

The first connector comprises a first optical input-output part through which light is incident or emitted, at least two guide holes opened in the Z direction, and a shutter. The shutter is a plate covering the first optical input-output part when the daughter board is not inserted and the shutter is pivotable about a rotary shaft extending in the Y direction and displaced in the X direction from the first optical input-output part. The rotary shaft is disposed in a portion other than an end of the plate.

The second connector comprises at least two guide pins extending in the Z direction, a pressing part, and a second optical input-output part. The guide pins are components of the second connector that first make contact with the first connector during insertion of the daughter board and the guide pins are inserted into the guide holes. The pressing part pivots the shutter by pressing the part of the shutter opposite to the part covering the first optical input-output part with respect to the rotary shaft of the shutter after degrees of freedom in the X direction and the Y direction of the second connector are restricted by the guide pins and the guide holes during insertion of the daughter board. The second optical input-output part is optically connected to the first optical input-output part when the daughter board is completely inserted. There is a space for accommodating the shutter pivoted by the pressing part between the pressing part and the second optical input-output part. The pressing part does not make contact with the first connector until the pressing part makes contact with the shutter during insertion of the daughter board.

The pressing part may project from the second optical input-output part toward the first connector by approximately a length in the X direction of the shutter. The guide pins may project from the second optical input-output part toward the first connector by the same length as in the pressing part and the guide holes may project from the shutter toward the second connector by at least a necessary length by which the guide pins are inserted into the guide holes to restrict degrees of freedom in the X direction and the Y direction of the second connector.

Effects of the Invention

In the backplane optical connector according to the present invention, when the second connector moves toward the first connector, the guide pins make contact with the insides of the guide holes and the pressing part makes contact with the shutter. The contamination inside the guide holes only diffuses within the guide holes. The shutter is pivoted so that its contaminated surface is not exposed to the first optical input-output part and the second optical input-output part. Therefore, in the backplane optical connector according to the present invention, the contamination adhering to the first connector is not scattered in the travel path of the second optical input-output part.

BRIEF DESCRIPTION OF THE DRAWINGS

FIGS. 2A to 2D schematically show the function of the backplane optical connector according to the present invention and FIG. 2A shows a state in which a first connector 101 has been separated from a second connector 102. FIG. 2B shows a state in which guide pins 121 have been inserted into guide holes 131. FIG. 2C shows a state in which a shutter 140 has been pivoted by a pressing part 126. FIG. 2D shows a state in which the first connector 101 and the second connector 102 have been connected to each other.

FIG. 3B shows a state in which the guide pins 121 have been inserted into the guide holes 131. FIG. 3C shows a state in which the shutter 140 has been pressed and pivoted by the pressing part 126.

FIG. 7A shows a state in which the guide pins 121 starts being inserted into the guide holes 131. FIG. 7B shows a state in which the pressing part 126 is pivoting the shutter 140.

FIG. 8B shows a state in which the first optical input-output part 9101 of the first connector 910 of the backplane optical connector and the second optical input-output part 9201 of the second connector 920 make contact and are optically connected with each other.

FIG. 9B shows a state in which the pressing pieces 926 have been inserted inside the shutter open-close assisting means 935 to determine the positions of the first connector 915 and the second connector 925 and the shutter 945 has been opened because the pressing pieces 926 have pressed part P of the shutter 945. FIG. 9C shows a state in which the first optical input-output part 9151 of the first connector 915 and the second optical input-output part 9251 of the second connector 925 have made contact and have been optically connected to each other.

FIG. 10B shows scattering of the contamination 999 adhering to the shutter 940 during insertion of the second connector 920.

FIG. 11B shows scattering of the contamination 999 adhering to the inside of the shutter open-close assisting means 935.

DETAILED DESCRIPTION OF THE EMBODIMENTS

Figure 1:
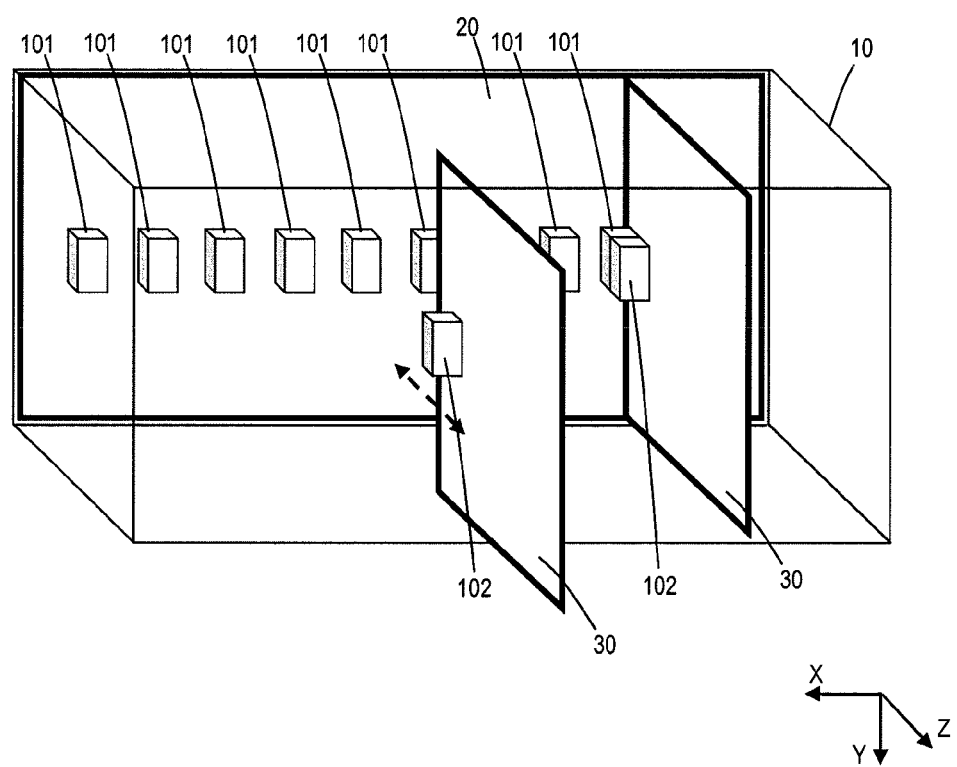
FIG. 1 shows the relationship between a backplane and a daughter board.

Embodiments of the present invention will be described in detail below. Constituent elements with the same functions are denoted by the same reference numerals and will not be described.

[First Embodiment]

<Summary of the Structure>

FIG. 1 shows the relationship between a backplane 20 and a daughter board 30. The backplane 20 (mother board) is present at the back of an apparatus 10. The backplane 20 has a circuit (not shown) and a plurality of first connectors 101 and a plurality of daughter boards 30 can be connected to the backplane 20. The daughter board 30 has the second connector 102 and is inserted or removed in a direction orthogonal to a surface of the backplane 20. It is assumed that the direction orthogonal to a surface of the daughter board 30 is the X direction, the direction parallel to a surface of the daughter board 30 and a surface of the backplane 20 is the Y direction, and the direction orthogonal to a surface of the backplane 20 is the Z direction.

FIGS. 2A to 2D schematically show the function of a backplane optical connector 100 according to the present invention. FIG. 2A shows a state in which the first connector 101 has been separated from a second connector 102. FIG. 2B shows a state in which the guide pins 121 have been inserted into the guide holes 131. FIG. 2C shows a state in which the shutter 140 has been pivoted by the pressing part 126. FIG. 2D shows a state in which the first connector 101 and the second connector 102 have been connected to each other.

The backplane optical connector 100 according to the present invention comprises the first connector 101 secured to the backplane 20 and the second connector 102 mounted on a portion of the daughter board 30 close to the backplane 20, the daughter board 30 being allowed to be inserted or removed in a direction orthogonal to a surface of the backplane 20. The second connector 102 is mounted on the daughter board 30 so as to have degrees of freedom in the X direction and the Y direction. For example, degrees of freedom in the X direction and the Y direction may be ensured using a hole with an oval section, long rod, brim, or the like.

The first connector 101 comprises a first optical input-output part 1101, at least two guide holes 131, and the shutter 140; the first optical input-output part 1101, through which light is incident or emitted, is an end surface of an optical component 110. The first optical input-output part 1101 only needs to receive or transmit light in the Z direction, for example. However, the first optical input-output part 1101 may receive or transmit light in a direction slanted from the Z direction. The shutter 140 is a plate covering the first optical input-output part 1101 when the daughter board 30 is not inserted and the shutter 140 is pivotable about a rotary shaft 150 extending in the Y direction and displaced in the X direction from the first optical input-output part 1101. For example, the shutter 140 only needs to be configured to pivot so as to cover the first optical input-output part 1101 using a spring or the like if no external force is applied. The rotary shaft 150 is disposed in a position other than an end of the plate (the shutter 140). The guide holes 131 are holes formed in guide parts 130 and opened in the Z direction.

The second connector 102 comprises at least two guide pins 121 extending in the Z direction, the pressing part 126, and the second optical input-output part 1201; the second optical input-output part 1201, through which light is incident or emitted, is an end surface of an optical component 120. The second optical input-output part 1201 only needs to receive or transmit light in the Z direction, for example. However, the second optical input-output part 1201 may receive or transmit light in a direction slanted from the Z direction as long as the second optical input-output part 1201 can be optically coupled with the first optical input-output part 1101. There is a space 129 for accommodating the shutter 140 (a component 140' indicated by the dotted line in FIG. 2A represents the pivoted shutter 140) pivoted by the pressing part 126 between the pressing part 126 and the second optical input-output part 1201. The guide pins 121 are components of the second connector 102 that first make contact with the first connector 101 during insertion of the daughter board 30 and the guide pins 121 are inserted into the guide holes 131. Presence of two or more guide pins 121 and two or more guide holes 131 restricts degrees of freedom in the X direction and the Y direction of the second connector 102 (see FIG. 2B).

Then, the pressing part 126 pivots the shutter 140 by pressing the part (that is, point P in FIG. 2A) of the shutter 140 opposite to the part covering the first optical input-output part 1101 with respect to the rotary shaft 150 of the shutter 140 (see FIG. 2C). The pressing part 126 does not make contact with any components of the first connector 101 until the pressing part 126 makes contact with the shutter 140 during insertion of the daughter board 30. In addition, since degrees of freedom of the second connector 102 in the X direction and the Y direction have been restricted by the guide pins 121 and the guide holes 131 during insertion of the daughter board 30, the positions in the X direction and the Y direction of the pressing part 126 are determined with precision high enough to perform mechanical motion. That is, since a floating structure does not need to be considered to determine the size of the shutter 140, the shutter 140 can be downsized. This is greatly different from the technique in patent literature 1. In the technique in patent literature 1, since the X direction and the Y direction of the first connector 910 are not restricted yet when the second connector 920 presses the shutter 940, the position at which the second connector 920 presses the shutter 940 varies. Accordingly, the shutter 940 of the backplane optical connector in patent literature 1 is forced to become large to some extent.

If the second connector 102 is inserted, the shutter 140 (a component 140' indicated by the dotted line in FIG. 2A represents the pivoted shutter 140) pivoted by the pressing part 126 enters the space 129. The second optical input-output part 1201 is optically connected to the first optical input-output part 1101 when the daughter board 30 is completely inserted (see FIG. 2D).

In FIGS. 2A to 2D, the guide pins 121 and the guide holes 131 are disposed in positions opposite to the pressing part 126 and the rotary shaft 150 across the optical components 110 and 120 so that a summary of the function can be easily described. However, the positions are not limited to this example. The guide pins 121 and the guide holes 131 may be displaced in the Y direction from the optical components 110 and 120 or may be disposed in other positions. Since the degrees of freedom in the X direction and the Y direction of the second connector 102 can be restricted by at least two guide pins 121 and guide holes 131, the positions of the guide pins 121 and the guide holes 131 may be determined arbitrarily.

In the example in FIGS. 2A to 2D, the length in the X direction of the shutter 140 is approximately equal to the sum of the length in the X direction of the first optical input-output part 1101, the length in the X direction of the space 129, and the length (thickness) in the X direction of the pressing part 126. This dimension shortens the length in the X direction of the shutter, thereby reducing the intervals at which daughter boards 30 are inserted into the backplane 20. However, the length of the shutter 140 is not limited to this example and, if there is a reason for increasing the intervals between daughter boards 30, an increase in the length in the X direction of the shutter 140 does not have disadvantage. Here, "approximately" is used to allow manufacturing error or the like. In the example shown in FIGS. 2A to 2D, the pressing part 126 projects from the second optical input-output part 1201 toward the first connector 101 by approximately the length in the X direction of the shutter 140. Accordingly, the length in the Z direction of the second connector is shortened so that the shutter 140 does not make contact with the second optical input-output part 1201 even if the part of the shutter 140 that covers the first optical input-output part 1101 is pivoted.

In the example shown in FIGS. 2A to 2D, the guide pins 121 project from the second optical input-output part 1201 toward the first connector 101 by the same length as in the pressing part 126. The guide holes 131 may project from the shutter 140 toward the second connector 102 by at least a necessary length by which the guide pins 121 are inserted into the guide holes 131 to restrict degrees of freedom in the X direction and the Y direction of the second connector 102. Accordingly, the dimension in the Z direction of the second connector does not need to be enlarged for the guide pins 121 and the shutter 140 can be pivoted after restricting degrees of freedom in the X direction and the Y direction of the second connector 102.

<Reason for Being Capable of Solving the Problems>

Figure 3A:
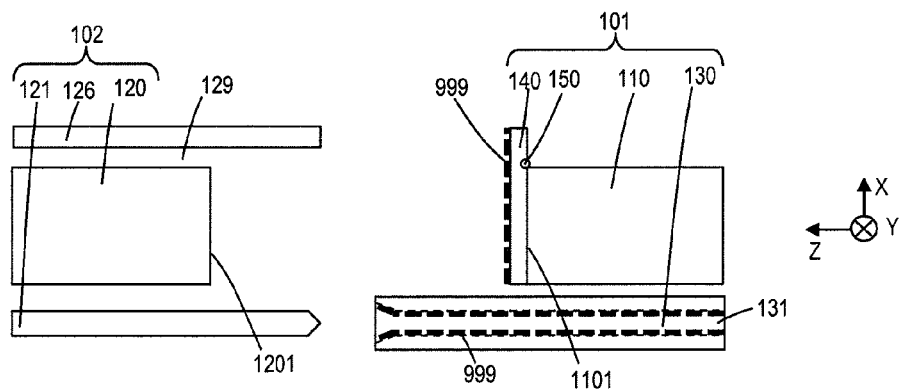
FIGS. 3A to 3C show diagrams for describing a solution for the problems in the backplane optical connector according to the present invention and FIG. 3A shows a state before the second connector 102 makes contact with the first connector 101.
Figure 3B:
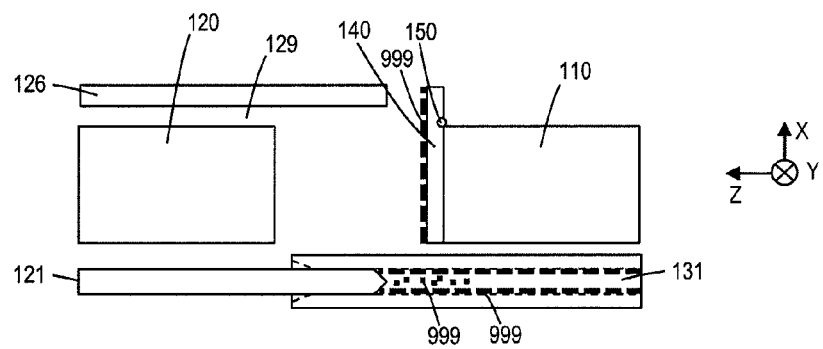
Figure 3C:
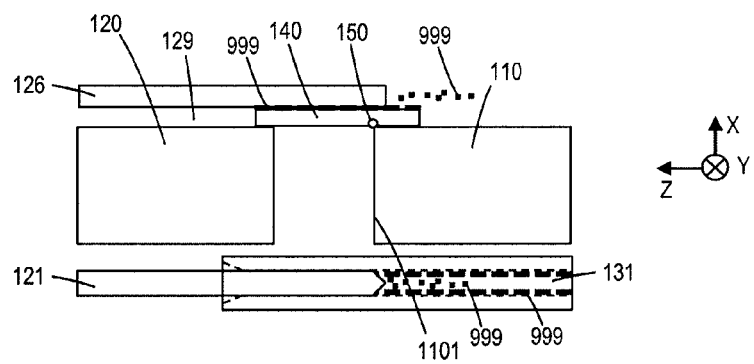

FIGS. 3A to 3C show diagrams for describing a solution for the problems in the backplane optical connector 100 according to the present invention. In FIGS. 3A to 3C, the contamination 999 is indicated only in the part related to the description. Although not indicated in parts not related to the description, contamination also adheres to the outer surface of the first connector 101 as well. FIG. 3A shows a state before the second connector 102 makes contact with the first connector 101. FIG. 3B shows a state in which the guide pins 121 have been inserted into the guide holes 131. FIG. 3C shows a state in which the shutter 140 has been pressed and pivoted by the pressing part 126.

As is apparent from FIGS. 3B and 3C, the contamination 999 on the inner surface of the guide holes 131 is removed and scattered by the guide pins 121. However, the contamination 999 is scattered only within the guide holes 131. As is apparent from FIG. 3C, the contamination 999 also adheres to the outer surface of the shutter 140. This contamination 999 is removed and scattered by the pressing part 126. However, the contamination 999 is not scattered in the travel path of the second optical input-output part 1201. Since the pressing part 126 does not make contact with any components of the first connector 101 until the pressing part 126 makes contact with the shutter 140 during insertion of the daughter board 30, contamination other than that on the shutter 140 is not scattered. Therefore, the backplane optical connector according to the present invention has no risk of contaminating the first optical input-output part 1101 and the second optical input-output part 1201.

<Specific Examples>

Figure 4:
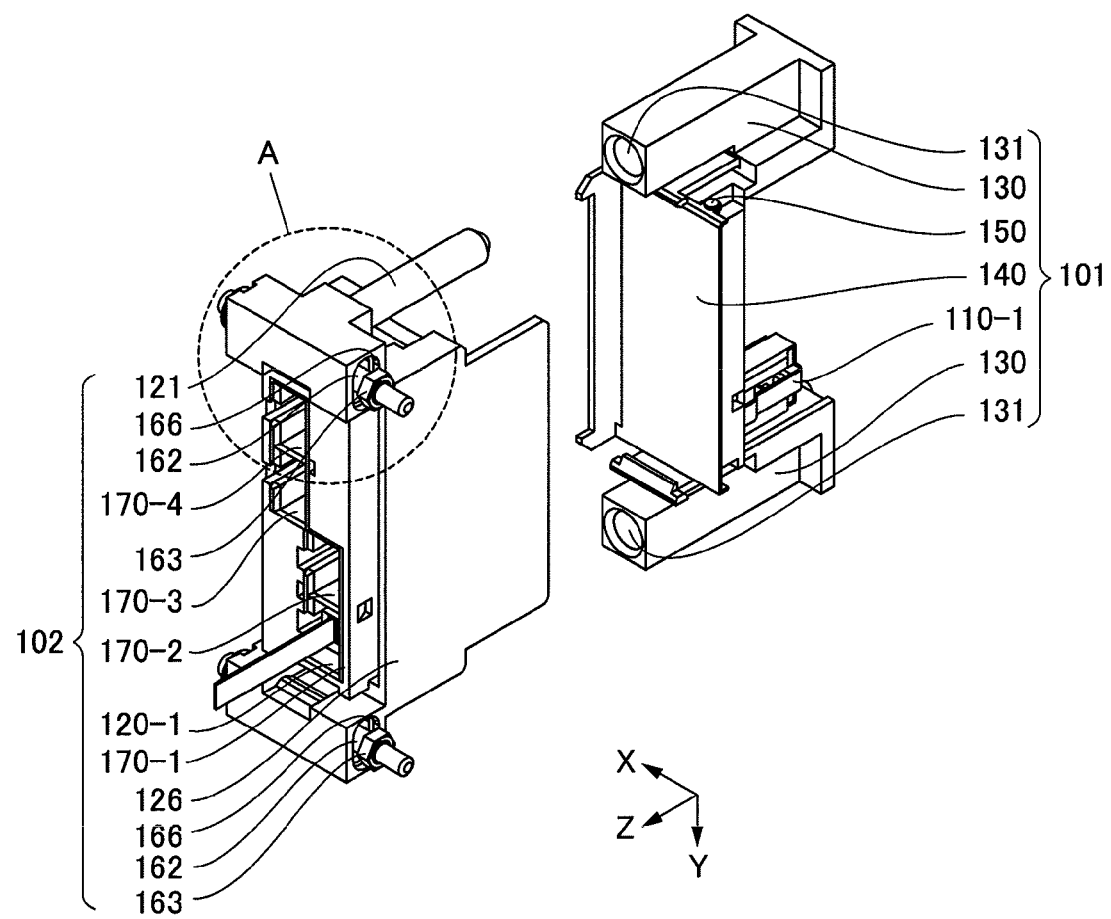
FIG. 4 shows perspective views of a specific example of the backplane optical connector according to the present invention.

FIG. 4 is a perspective view showing a specific example of the backplane optical connector according to the present invention. The first connector 101 comprises an optical component 110-1, guide parts 130 having two guide holes 131, the shutter 140, and the rotary shaft 150. Although hided in this drawing, the optical component 110-1 is secured to an optical component securing part 190-1 and the first optical input-output part 1101 of the optical component 110-1 is covered with the shutter 140. The second connector 102 comprises two guide pins 121, the pressing part 126, optical component securing parts 170-1, 170-2, 170-3, and 170-4, an optical component 120-1, the rods 162, brims 163, and holes 166. In this example, no optical components are secured to the optical component securing parts 170-2, 170-3, and 170-4. In addition, the first connector 101 also has optical component securing parts 190-2, 190-3, and 190-4 (not shown because they are hided) in portions facing the optical component securing parts 170-2, 170-3, and 170-4. In the specific example in FIG. 4, the guide pins 121 and the guide holes 131 are disposed in positions displaced in the Y direction (parallel to a surface of the daughter board) from the optical components 110-1 and 120-1.

Figure 5:
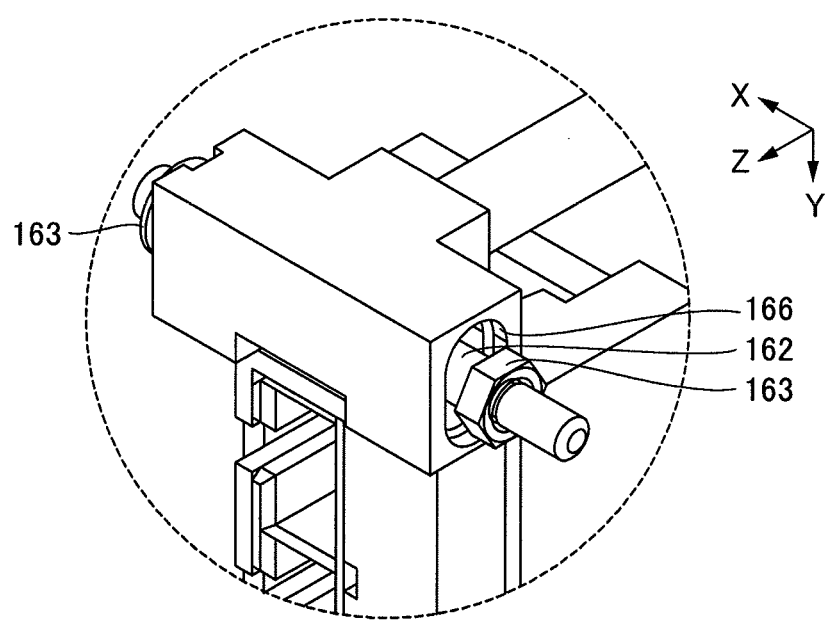
FIG. 5 is an enlarged view of section A in FIG. 4.
Figure 6:
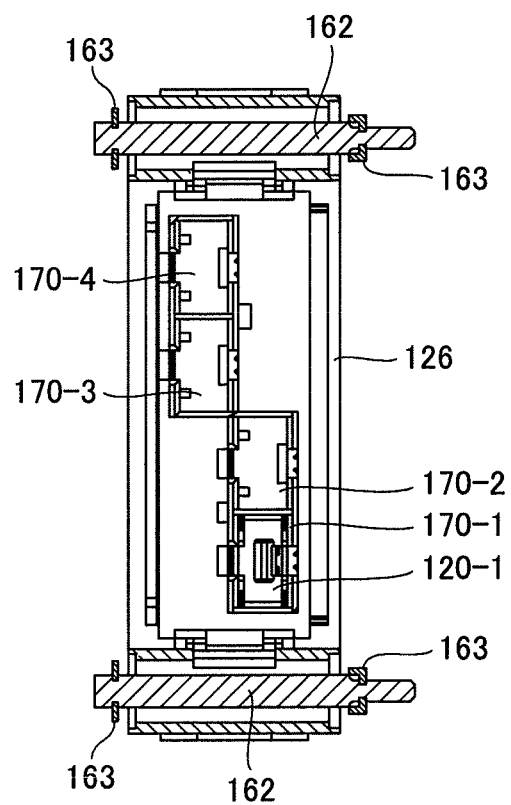
FIG. 6 is a sectional view of the backplane optical connector according to the present invention in a plane including the axes of two rods 162.

FIG. 5 is an enlarged view showing section A in FIG. 4 and a floating mechanism of the second connector. FIG. 6 is a sectional view in a plane comprising the axes of the two rods 162. The floating mechanism of the second connector 102 comprises the rods 162, the brims 163, and holes 166. The holes 166 are ellipses each having a longer axis in in the Y direction and a shorter axis in the Z direction. The rods 162 are rods each having a circular cross-section with a diameter a little shorter than the length in the Z direction of the hole 166 and the rods 162 pass through the holes 166. The difference between the diameter of the rod 162 and the length in the Z direction of the hole 166 may be manufacturing error. The difference between the diameter of the rod 162 and the length in the Y direction of the hole 166 represents degrees of freedom (length allowed for floating in the Y direction) in the Y direction of the second connector 102. The brims 163 are attached to the rod 162 to make the interval wider than the length in the X direction of the hole 166. The difference between the interval between the brims 163 and the length in the X direction of the hole represents degrees of freedom (length allowed for floating in the X direction) in the X direction of the second connector 102. If the rod 162 is orthogonally secured to a surface of the daughter board 30, the second connector 102 can be mounted on the daughter board 30 so as to have degrees of freedom in the X direction and the Y direction. The degrees of freedom in the X direction and the Y direction may be determined as appropriate by considering manufacturing and assembling error and so on of the backplane 20, the daughter board 30, and so on.

Figure 7A:
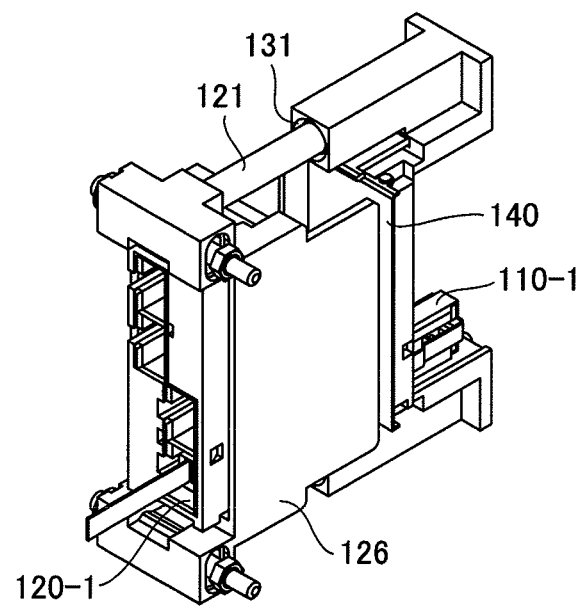
FIGS. 7A and 7B show perspective views of a specific example different from that of the backplane optical connector shown in FIG. 4
Figure 7B:
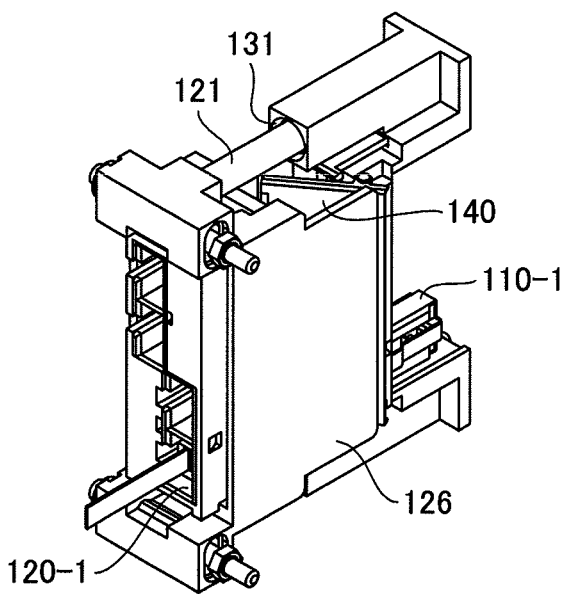
Figure 8A:
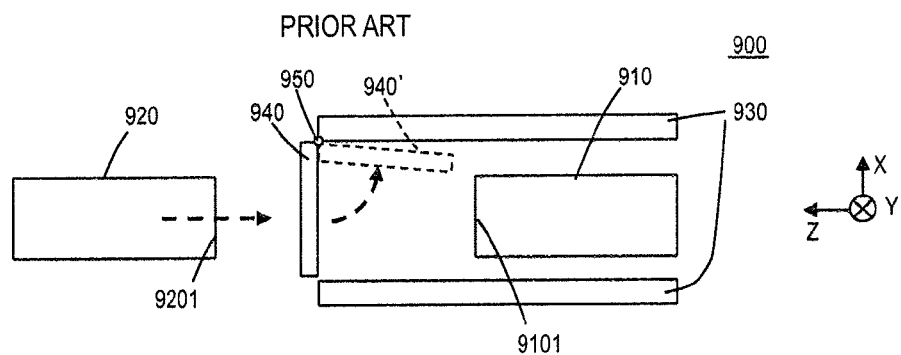
FIGS. 8A and 8B schematically show the structure of the backplane optical connector proposed in patent literature 1 and FIG. 8A shows a state in which the second connector 920 is approaching the first connector 910 during insertion of a daughter board for the backplane optical connector.
Figure 8B:
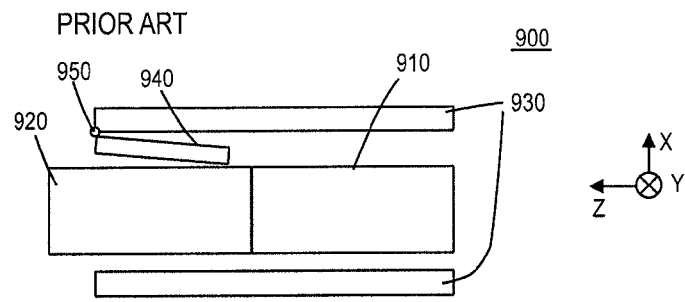
Figure 9A:
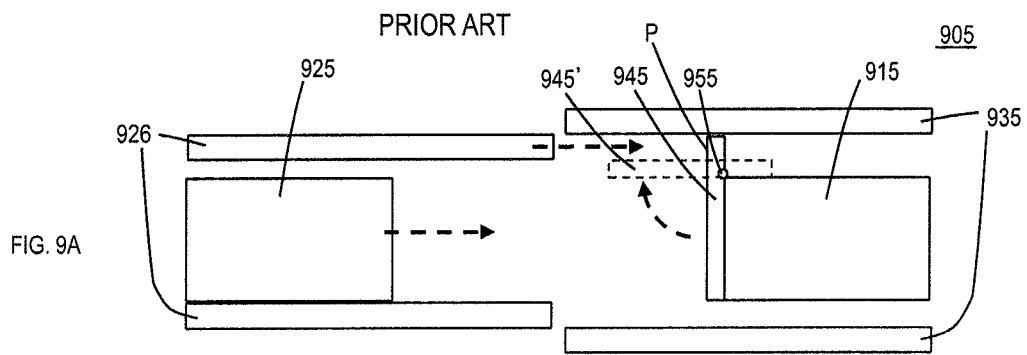
FIGS. 9A to 9C show the structure of the optical connector proposed in patent literature 2 and the motion of the shutter and FIG. 9A shows a state in which the second connector 925 is approaching a first connector 915.
Figure 9B:
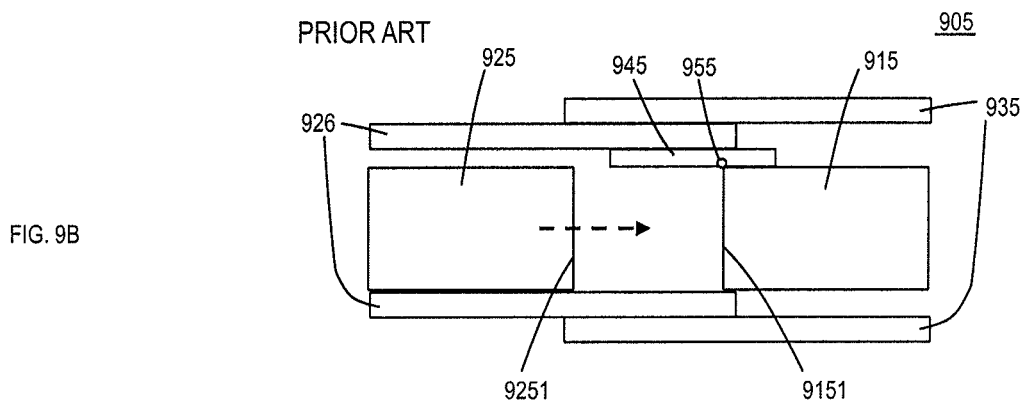
Figure 9C:
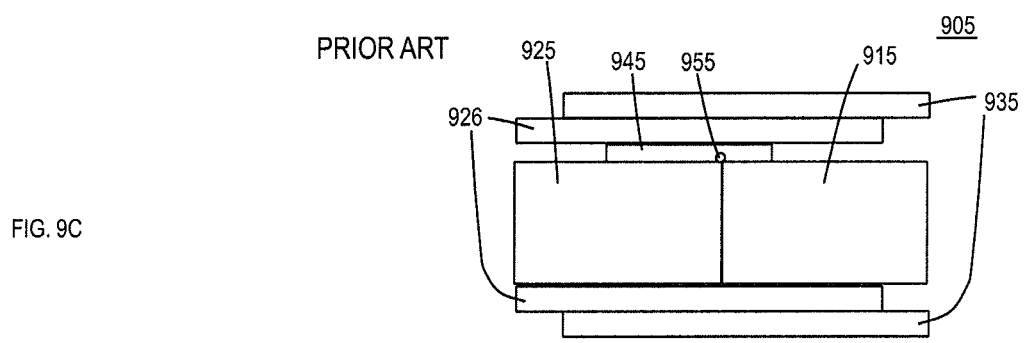
Figure 10A:
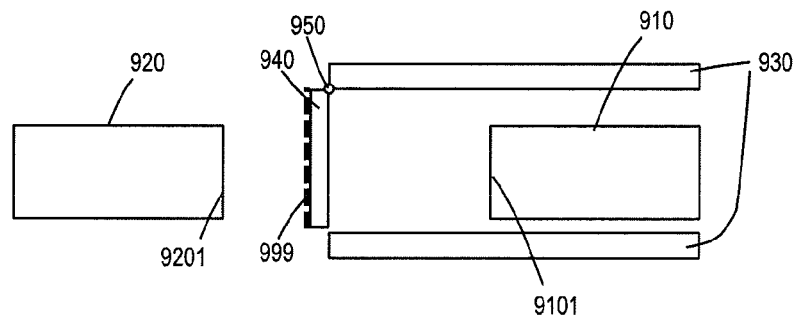
FIGS. 10A and 10B show problems with the backplane optical connector proposed in patent literature 1 and FIG. 10A shows the contamination 999 adhering to the outer surface of the shutter 940.
Figure 10B:
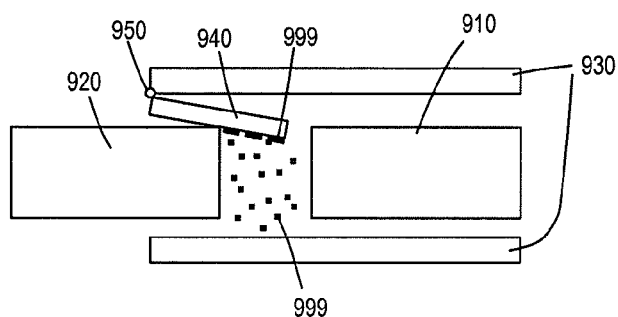
Figure 11A:
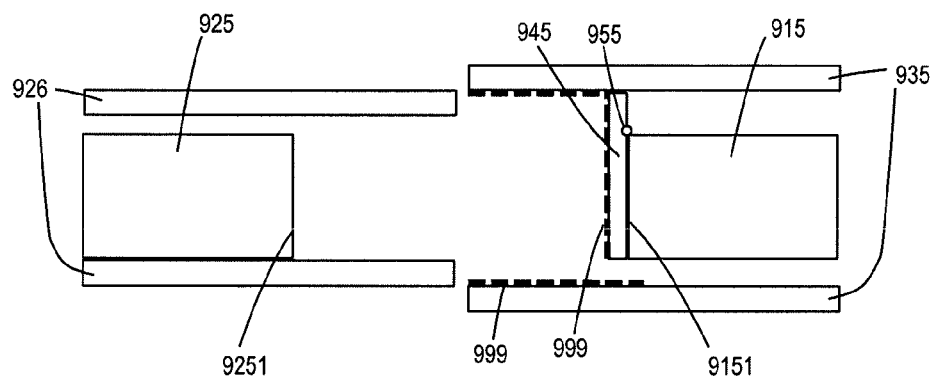
FIGS. 11A and 11B show problems with the optical connector proposed in patent literature 2 and FIG. 11A shows contamination adhering to the outside of the shutter 945 and the inside of the shutter open-close assisting means 935.
Figure 11B:
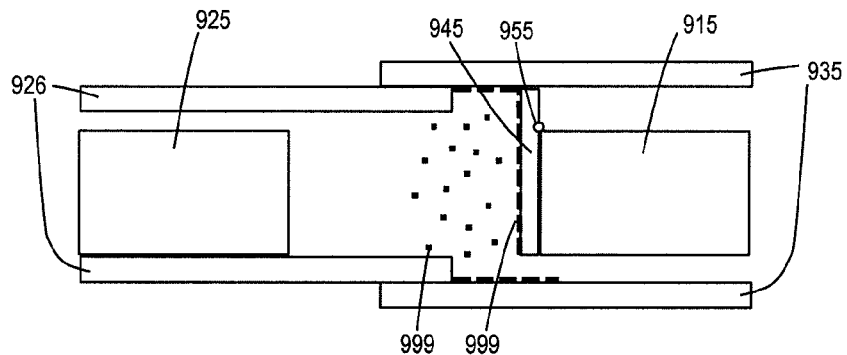

FIGS. 7A and 7B are perspective views showing a specific example different from that of the backplane optical connector shown in FIG. 4. FIG. 7A shows a state in which the guide pins 121 starts being inserted into the guide holes 131. FIG. 7B shows a state in which the pressing part 126 is pivoting the shutter 140. As shown above, effects of the invention can be obtained in the specific example shown in FIG. 4. In addition, the positional relationship between the guide holes of the first optical input-output part and the guide pins of the second optical input-output part may be changed, as described above.

DESCRIPTION OF REFERENCE NUMERALS

10 Apparatus
20 Backplane
30 Daughter Board
100, 900 Backplane Optical Connector
101, 910, 915 First Connector
102, 920, 925 Second Connector
110, 120 Optical Component
1101, 9101, 9151 First Optical Input-Output Part
1201, 9201, 9251 Second Optical Input-Output Part
121 Guide Pin
126 Pressing Part
129 Space
130 Guide Part
131 Guide Hole
140, 940, 945 Shutter
150, 950, 955 Rotary Shaft
162 Rod
163 Brim
166 Hole
170, 190 Optical Component Securing Part
905 Optical Connector
926 Pressing Piece
930 Cover
935 Shutter Open-Close Assisting Means

What is claimed is:

1. A backplane optical connector comprising a first connector secured to a backplane and a second connector mounted on a portion of a daughter board close to the backplane, the daughter board being allowed to be inserted or removed in a direction orthogonal to a surface of the backplane, wherein:

when a direction orthogonal to a surface of the daughter board is an X direction, a direction parallel to the surface of the daughter board and the surface of the backplane is a Y direction, and a direction orthogonal to the surface of the backplane is a Z direction, the second connector is mounted on the daughter board to have degrees of freedom in the X direction and the Y direction, the first connector comprises a first optical input-output part through which light is incident or emitted, at least two guide holes opened in the Z direction, and a shutter configured as a plate covering the first optical input-output part when the daughter board is not inserted, the shutter being pivotable about a rotary shaft extending in the Y direction and being displaced in the X direction from the first optical input-output part, the rotary shaft being disposed in a portion other than an end of the plate, the second connector comprises at least two guide pins that are components of the second connector and first make contact with the first connector during insertion of the daughter board, the guide pins being inserted into the guide holes and extending in the Z direction, a pressing part that pivots, after degrees of freedom in the X direction and the Y direction of the second connector are restricted by the guide pins and the guide holes during insertion of the daughter board, the shutter by pressing a part of the shutter opposite to a part covering the first optical input-output part with respect to the rotary shaft of the shutter, and a second optical input-output part optically connected to the first optical input-output part when the daughter board is completely inserted, there is a space for accommodating the shutter pivoted by the pressing part between the pressing part and the second optical input-output part, and the pressing part does not make contact with the first connector until the pressing part makes contact with the shutter during insertion of the daughter board.

2. The backplane optical connector according to claim 1, wherein the pressing part projects from the second optical input-output part toward the first connector by approximately a length in the X direction of the shutter.

3. The backplane optical connector according to claim 1, wherein the guide pins project from the second optical input-output part toward the first connector by the same length as in the pressing part and the guide holes project from the shutter toward the second connector by at least a necessary length by which the guide pins are inserted into the guide holes to restrict degrees of freedom in the X direction and the Y direction of the second connector.

4. The backplane optical connector according to claim 2, wherein the guide pins project from the second optical input-output part toward the first connector by the same length as in the pressing part and the guide holes project from the shutter toward the second connector by at least a necessary length by which the guide pins are inserted into the guide holes to restrict degrees of freedom in the X direction and the Y direction of the second connector.

* * * * *